United States Patent
Ahrens

(10) Patent No.: US 9,596,312 B2
(45) Date of Patent: Mar. 14, 2017

(54) STATIC RESOURCE CACHING

(71) Applicant: Facebook, Inc., Menlo Park, CA (US)

(72) Inventor: Spencer Ahrens, Redwood City, CA (US)

(73) Assignee: Facebook, Inc., Menlo Park, CA (US)

(*) Notice: Subject to any disclaimer, the term of this patent is extended or adjusted under 35 U.S.C. 154(b) by 506 days.

(21) Appl. No.: 13/752,321

(22) Filed: Jan. 28, 2013

(65) Prior Publication Data

US 2014/0215019 A1 Jul. 31, 2014

(51) Int. Cl.
*G06F 17/30* (2006.01)
*H04L 29/08* (2006.01)

(52) U.S. Cl.
CPC ...... *H04L 67/2842* (2013.01); *G06F 17/3089* (2013.01); *G06F 17/30893* (2013.01); *G06F 17/30902* (2013.01); *H04L 67/22* (2013.01)

(58) Field of Classification Search
CPC ............... G06F 17/21; G06F 17/3089; G06F 17/30893; G06F 8/427; G06F 17/2247; G06F 17/30899; G06F 17/30902; G06F 17/30905; G06F 8/31; G06F 8/51; G06F 8/61; G06F 8/64; H04L 67/2842
See application file for complete search history.

(56) References Cited

U.S. PATENT DOCUMENTS

| | | | |
|---|---|---|---|
| 5,946,697 A * | 8/1999 | Shen ........................... | 715/205 |
| 6,182,133 B1 * | 1/2001 | Horvitz ........................ | 709/223 |
| 6,195,696 B1 * | 2/2001 | Baber ................. | G06F 17/3089 |
| | | | 707/E17.116 |
| 6,374,289 B2 * | 4/2002 | Delaney et al. .............. | 709/203 |
| 7,243,136 B2 * | 7/2007 | Huston et al. ................ | 709/217 |
| 8,291,312 B1 * | 10/2012 | Zhou ............................ | 715/234 |
| 8,433,787 B2 * | 4/2013 | Garcia-Luna-Aceves et al. ............................. | 709/224 |
| 8,707,162 B1 * | 4/2014 | Jain ............................. | 715/234 |
| 2006/0075068 A1 * | 4/2006 | Kasriel et al. ................ | 709/217 |
| 2006/0230234 A1 * | 10/2006 | Bentolila et al. ............. | 711/133 |
| 2010/0088612 A1 * | 4/2010 | Jia et al. ....................... | 715/745 |
| 2011/0145321 A1 * | 6/2011 | Jiang ............................ | 709/203 |
| 2011/0184936 A1 * | 7/2011 | Lymberopoulos et al. .. | 707/721 |
| 2013/0007371 A1 * | 1/2013 | Hilerio et al. ................ | 711/133 |
| 2014/0006538 A1 * | 1/2014 | Oikonomou .................. | 709/213 |
| 2014/0201256 A1 * | 7/2014 | Pinheiro et al. ............. | 709/201 |

* cited by examiner

*Primary Examiner* — Aaron Strange
(74) *Attorney, Agent, or Firm* — Perkins Coie LLP

(57) ABSTRACT

A method and system for static resource caching in a networking system are provided. The system includes a fetcher instantiated on a particular user device. The fetcher can be a browser plug-in, a separate process or a program integrated into another process on the particular user device. The fetcher downloads static resource data from a web server and groups the downloaded static resource data into a plurality of static resource packages. In some embodiments, the fetcher may predict new static resource package(s) that the particular user may need by analyzing the particular user's activities on the web server and web traffics on the particular user device. Therefore, static resource data from the web server may be effectively cached on the particular user device even before any browser is launched on the particular user device.

20 Claims, 6 Drawing Sheets

STATIC RESOURCE CACHING

TECHNICAL FIELD

Various embodiments of the present disclosure generally relate to processing web page resources, and in particular to processing static resources.

BACKGROUND

A typical web page includes static content and dynamic content. Static content is the substantive content on the web page that does not change based on context. For example, static content can be the same for all users. Static content is normally stored in files on the web server rendering the web page.

On the other hand, dynamic content is the content on the web page that changes based on context. For example, dynamic content may vary from user to user based on user input.

SUMMARY

Embodiments of the present disclosure provide a variety of methods and systems for caching static resource data from a web server on a particular user device. The system includes a fetcher instantiated on a particular user device. The fetcher may fetch static resource data from the web server by communicating with the web server via an intelligent API. The fetched static resource data can be grouped into a plurality of static resource packages. The fetcher may keep a status map between the plurality of static resource packages (i.e, package IDs) and their corresponding resource links and version numbers. In one embodiment, the fetcher can predict new static resource package(s) that the particular user may need by analyzing web traffics on the particular user device and activities of the particular user on the web server. Newly predicted static resource package(s) can be effectively fetched and cached on the fetcher even before any browser is launched on the particular user device. Therefore, the particular user may readily access web pages from the web server with minimum latency.

In one embodiment, the fetcher can be a browser plug-in, a separate process or a program integrated into another process on the particular user device. In another embodiment, the fetcher can be integrated into an application on the particular user device that deals with point-to-point communications and/or multicast communications between the particular user device and the web server.

In some embodiments, the static resource data are grouped into the plurality of static resource packages with different levels of granularity. The level of granularity may be determined by specific requirements of the particular user device, specific requirements of applications on the particular user device, attributes of individual static resource files and images, or any combination of thereof. In some embodiments, each static resource package may have a plurality of versions to accommodate different types of user devices, different types of applications, and/or different languages.

In some embodiments, each HTML/XML file or a unique graphic image may be grouped into a separate static resource package. In another embodiment, multiple HTML/XML files and/or multiple graphic images may be grouped together into a single static resource package according to a predefined algorithm. For example, multiple HTML/XML files and/or multiple graphic images with the same resource link can be grouped into a single static resource package. For another example, HTML/XML files and graphic images may be grouped to separate static resource packages based on the individual file's or graph image's update frequency.

In some embodiments, each individual static resource package is cached and updated as a whole on the fetcher. In another embodiment, the fetcher may download delta changes to a cached specific static resource package and update the cached specific static resource package with the downloaded delta changes.

In some embodiments, the web server may request the web traffics on the particular user device. The web server predicts new static resource packages that the particular user may need by analyzing the web traffics on the particular user device and the user's credentials and/or activities on the web server according to a computing algorithm. In some embodiments, the computing algorithm can be dynamically constructed over time based on past predictions and the particular user's actual needs.

In some embodiments, the fetcher may predict new static resource packages that the particular user may need based on the web traffics on the particular user device. In some implementations, the fetcher makes the predictions by analyzing the web traffics on the particular user device and the user activities on the web server. In some embodiments, new static resource packages can be predicted by incorporating the fetcher's predictions into the analysis results from the web server.

In some embodiments, the fetcher may generate and store a status map of the plurality of static resource data packages. The status map includes identifications of static resource data packages (i.e., package IDs), their resource links, and/or their version numbers. The status map can be a hash table, a tree, a binary tree, a dictionary, a list, an array, a vector, a database, or any combination thereof. In some embodiments, the status map can be cached on the specific fetcher 320, span multiple locations and databases of the web server, and/or store in a cloud. In one embodiment, the status map is generated and maintained by the specific fetcher 320 on the particular user device. In another embodiment, the status map is generated and maintained by the web server.

When there is any change to cached static resource packages on the fetcher or a new static resource package is predicted, the status map can be updated in substantially real time. According to updated status map, the fetcher may determine whether desired static resource packages with suitable version numbers are cached in its memory. If any static resource package is not cached, the fetcher may fetch the package from a CDN or directly from the web server via the intelligent API.

In some embodiments, the CDN is incorporated into the web server. Upon receiving a request from the fetcher to download a specific static resource package, the incorporated CDN may determine an optimized route for the fetcher to download the specific static resource package. For example, the CDN can provide the specific static resource package directly from its data storage or redirect the request to original databases that can provide the specific static resource package with the lowest latency.

In some embodiments, the fetcher may communicate with the web server based on a predefined policy to ensure that correct static resource packages are cached. Whenever a new static resource package is received, the fetcher may request from the web server a list of static resource packages and their suitable version numbers that the particular user may need. If incorrect static resource package is received, the fetcher re-downloads the correct static resource package with the suitable version number.

In some embodiments, the predefined policy requires the fetcher to periodically re-download cached static resource packages after a certain period of time (e.g., a day). In some embodiments, the fetcher may periodically evict cached static resource packages that have not been used by the particular user for a predetermined period of time (e.g., 2 days). In some embodiments, the fetcher sets a storage cap (e.g., 5 GB) for static resource packages from a particular web server.

While multiple embodiments are disclosed, still other embodiments of the present disclosure will become apparent to those skilled in the art from the following detailed description, which shows and describes illustrative embodiments of the invention. As will be realized, the invention is capable of modifications in various aspects, all without departing from the scope of the present disclosure. Accordingly, the drawings and detailed description are to be regarded as illustrative in nature and not restrictive.

BRIEF DESCRIPTION OF THE DRAWINGS

Embodiments of the present disclosure will be described and explained through the use of the accompanying drawings in which.

Figure 1:
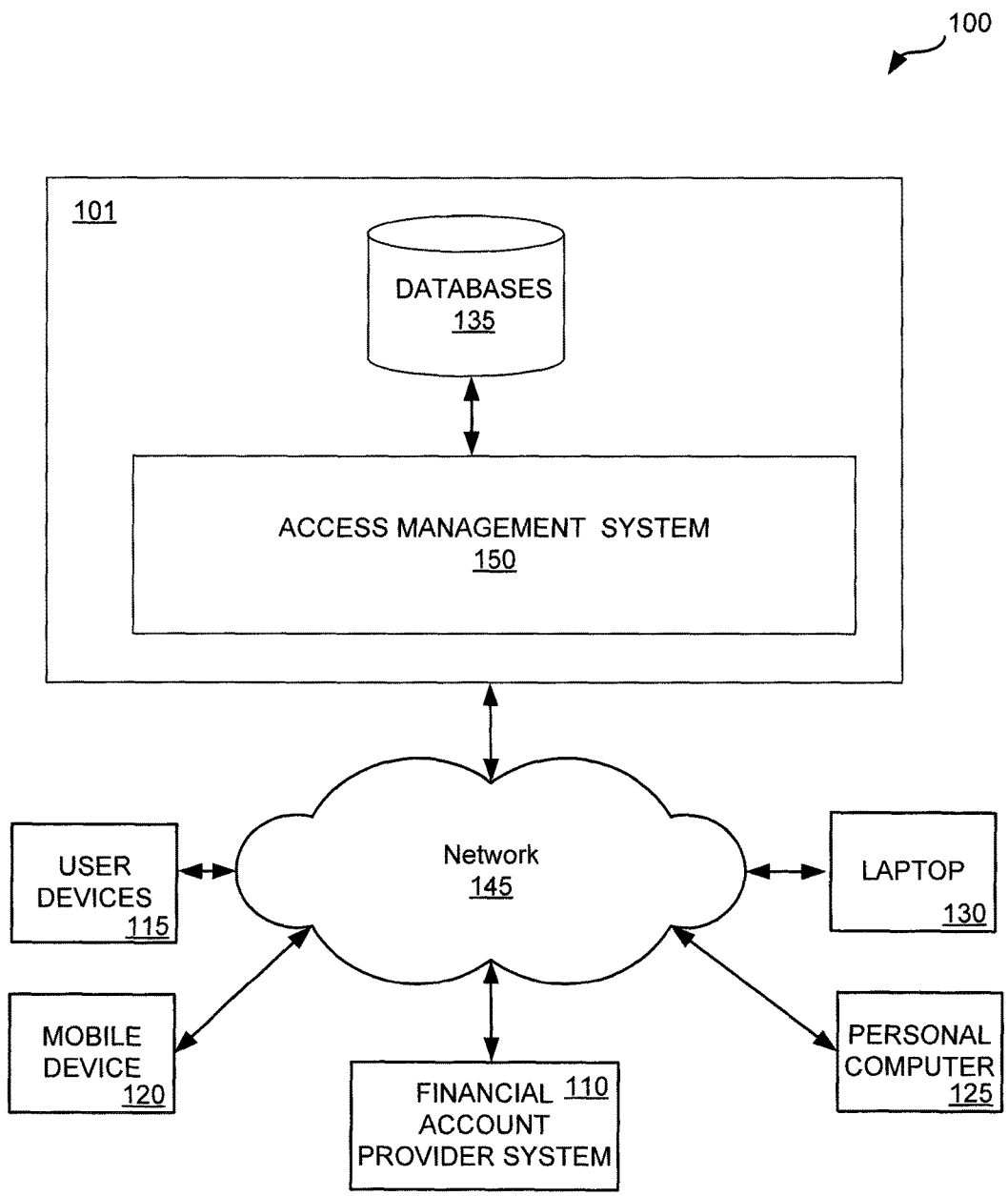
FIG. 1 illustrates an example of a system environment 100 for a networking system 101 in which some embodiments of the present disclosure may be utilized.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

The following description and drawings are illustrative and are not to be construed as limiting. Numerous specific details are described to provide a thorough understanding of the disclosure. However, in certain instances, well-known details are not described in order to avoid obscuring the description. References to one or an embodiment in the present disclosure can be, but not necessarily are, references to the same embodiment. Such references mean at least one of the embodiments.

Reference in this specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

However, existing database systems typically operate independently and deal with parallel processes or threads within a single system to analyze streams of data from a signal site. It remains a challenge to effectively recover failed threads of data streams from a large number of sites.

Various embodiments of the present disclosure generally relate to processing web page resources. More specifically, various embodiments of the present disclosure relate to systems and methods for caching static resource data from the networking system 101 on a particular user device. Traditionally, when a particular user opens a specific web page via a browser on a user device, the user device sends a URL request to web server of the web page. The web page then provides static resource content and dynamic resource content to the user device. Depending on the availability of network bandwidth, there may be substantial delay in opening the specific web page on the user device. In contrast, various embodiments of the present disclosure support caching static resource content of web pages from a web server on a fetcher instantiated on a user device. When the web pages are opened on the user device, static resource content can be readily available for display on the user device.

While examples described herein refer to a networking system 101, the descriptions should not be taken as limiting the scope of the present disclosure. Various alternatives, modifications, and equivalents will be apparent to those skilled in the art without varying from the spirit of the invention. For example, static resource caching may be implemented in any user device in accessing a web page or any computing system for providing a web page. For another example, static resource caching may be implemented in any computing system having a web server system. The web server system may include a database management system (DBMS), such as HBase, MySQL, FoxPro, IBM DB2, Linter; Microsoft SQL Server, Oracle, PostgreSQL and SQLite etc.

FIG. 1 illustrates an example of a system environment 100 for a networking system 101 in which some embodiments of the present disclosure may be utilized. The system environment 100 shown in FIG. 1 includes a networking system 101, user devices 115, a financial account provider system 110 and a network 145. In other embodiments, the system environment 100 may include different and/or additional components than those shown by FIG. 1.

The networking system 101, further described below in conjunction with FIG. 2, comprises one or more computing devices storing user profiles associated with users and/or other objects as well as connections between users and other users and/or objects, an access management system 150 and a plurality of databases, such as database 135. Users can store data (i.e., photos, videos, messages, electronic documents, e-mails, records) and related analytics (i.e., usage analytics) in the networking system 101. The data can be submitted through various user devices 115 and/or other devices to allow the data to be stored on database 135. As illustrated in FIG. 1, these devices and tools may use network 145 to submit and retrieve information from the networking system 101.

In some embodiments, users join the networking system 101 and then add connections to other users or objects of the networking system 101 to which they desire to be connected. As further described below in conjunction with FIG. 1, users of the networking system 101 may be individuals or entities such as businesses, organizations, universities and manufacturers. The networking system 101 allows its users to interact with each other as well as with other objects maintained by the networking system 101. In some embodiments, the networking system 101 allows users to interact with third-party websites and the financial account provider 110.

Based on stored data about users, objects and connections between users and/or objects, the networking system 101 generates and maintains a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the networking system 101 modifies edges connecting the various nodes to reflect the interactions.

In some embodiments, the networking system 101 generates web pages. When receiving a request of a specific web page from a particular user device, the networking system 101 may provide the web page based on factors, such as specific attributes, parameters and settings of the specific user device and/or application requesting the specific web page etc. The networking system 101 may further provide links to static resources that are not stored on the system 101.

User devices 115 can be any computing device capable of receiving user input as well as transmitting and/or receiving data via the network 145. In one embodiment, user devices 115 are a conventional computer system, such as a desktop 125 or laptop computer 130. In another embodiment, user devices 115 may be mobile device 120 having computer functionality, such as a personal digital assistant (PDA), mobile telephone, smart-phone or similar device. User devices 115 are configured to communicate with access management system 150, and/or the financial account provider via the network 145. In one embodiment, a user device executes an application allowing a user of the user devices to interact with the access management system 150. For example, user devices 115 can execute a browser application to enable interaction between the user devices 115 and access management system 150 via the network 145. In another embodiment, user devices 115 interact with access management system 150 through an application programming interface (API) that runs on the native operating system of the user device 208, such as IOS® or ANDROID™.

User devices 115 can be configured to communicate via the network 145, which may comprise any combination of local area and/or wide area networks, using both wired and wireless communication systems. In one embodiment, the network 145 may include one or more networks of any type (i.e., wired and/or wireless). For example, the network 145 may include a wide area network (WAN), a local area network (LAN), an ad hoc network, the Internet, an intranet, a personal area network (PAN), a storage area network, a home area network, a campus area network, a backbone network, a metropolitan area network (MAN), an enterprise private network, a virtual private network, a virtual network, a cellular telephone network, a satellite network, a telephone network (i.e., a Public Switched Telephone Network (PSTN)), an internet-work or a combination of two or more of these. The network 145 may use technologies such as Ethernet as defined by IEEE 802.XX, 4G Long Term Evolution (LTE), 3rd Generation Partnership Project (3GPP), Global System for Mobile Communications (GSM), Enhanced Data Rates for GSM Evolution (EDGE), Universal Mobile Telecommunications System (UMTS), High Speed Packet Access (HSPA), Code Division Multiple Access (CDMA), Worldwide Interoperability for Microwave Access (WiMAX), International Mobile Telecommunications-Advanced (IMT-Advanced) or a combination of two or more of these.

The networking protocols used in the network 145 may include Transmission Control Protocol (TCP) and Internet Protocol (IP), Internetwork Packet Exchange/Sequenced Packet Exchange (IPX/SPX), User Datagram Protocol (UDP), Internet Control Message Protocol (ICMP), Hypertext Transfer Protocol (HTTP), Post Office Protocol (POP3), File Transfer Protocol (FTP), Internet Message Access Protocol (IMAP), X.25, AX.25, AppleTalk or a combination of two or more of these. Data exchanged over the network 145 may be represented using formats such as HTML, SGML-based HTML and/or XML-based HTML etc.

Figure 2:
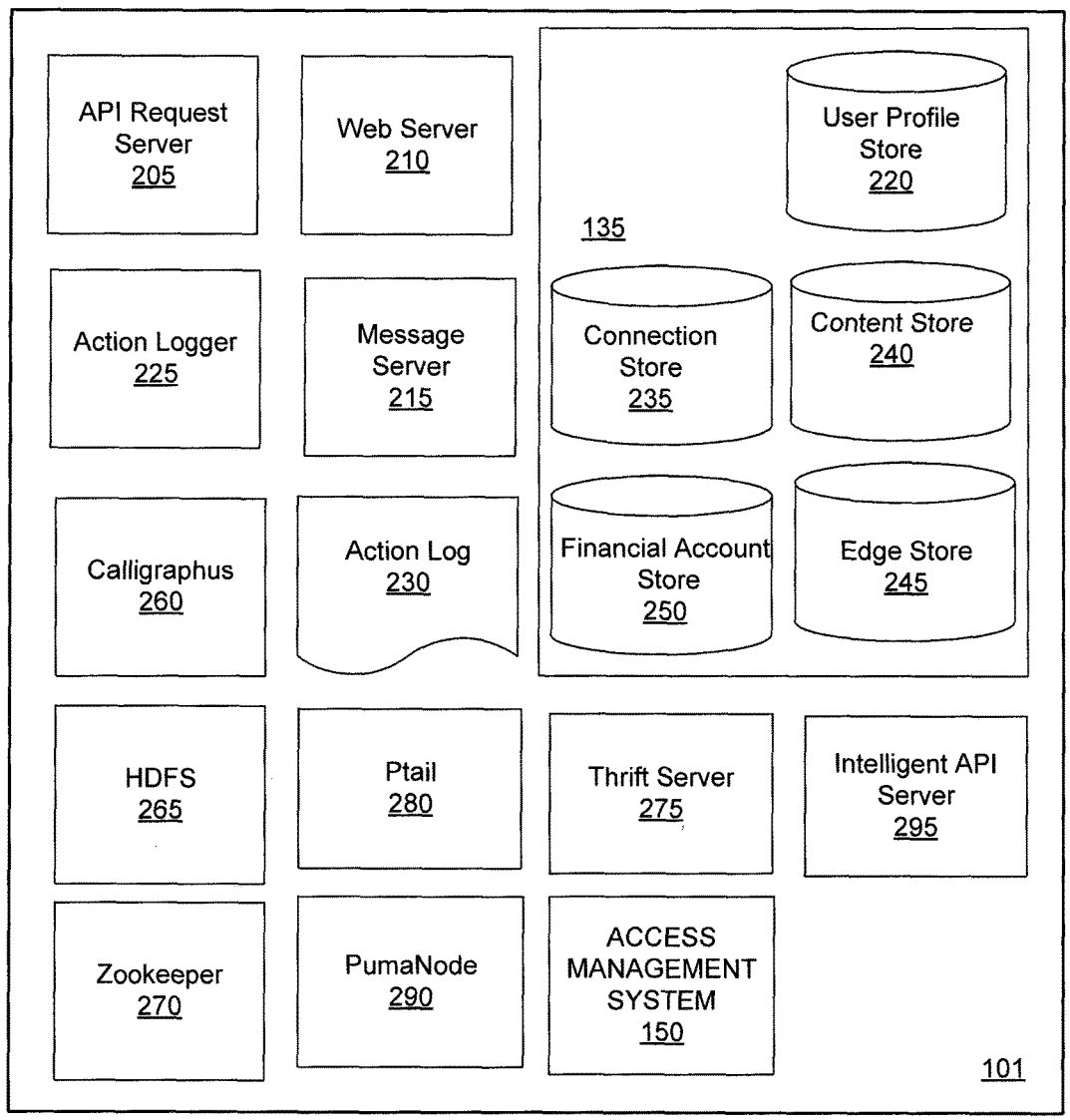
FIG. 2 is a block diagram of a system architecture of the networking system 101 in accordance with one or more embodiments of the present disclosure.

FIG. 2 is a block diagram of system architecture of the networking system 101, in accordance with one or more embodiments of the present disclosure. The networking system 101 shown by FIG. 2 includes an access management system 150, an action logger 225, an API request server 205, a message server 215, a web server 210, an action log 230, a Ptail 280, a Puma Node 290, a Hadoop Distributed File System (HDFS) 265, a Zookeeper and a database 135 (i.e., a user profile store 220, a content store 240, an edge store 245, a financial account store 250 and a connection store 235). In some embodiments, the networking system 101 may include additional, fewer or different modules for various applications. Conventional components such as network interfaces, security mechanisms, load balancers, failover servers, management and network operations consoles, and the like are not shown so as to not obscure the details of the system architecture.

Each user of the networking system 101 is associated with a user profile, which is stored in the user profile store 220. A user profile includes declarative information about the user that was explicitly shared by the user, and may also include profile information inferred by the networking system 101. In one embodiment, a user profile includes multiple data fields, each data field describing one or more attributes of the corresponding user of the networking system 101. The user profile information stored in user profile store 220 describes the users of the networking system 101 104, including biographic, demographic and other types of descriptive information, such as work experience, educational history, gender, hobbies or preferences, location and the like. A user profile may also store other information provided by the user, for example, images, videos or other objects. In certain embodiments, images of users may be tagged with identification information on users of the networking system 101 displayed in an image. A user profile in the user profile store 220 may also maintain references to actions by the corresponding user performed on content items in the content store 240 and stored in the edge store 245.

As further described below, a user profile may be associated with one or more financial accounts, allowing the user profile to include data retrieved from or derived from a financial account. A user may specify one or more privacy settings, which are stored in the user profile, that limit information from a financial account that the networking system 101 is permitted to access. For example, a privacy setting limits the networking system 101 to accessing the transaction history of the financial account and not the current account balance. As another example, a privacy setting limits the networking system 101 to a subset of the transaction history of the financial account, allowing the networking system 101 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the networking system 101. In one embodiment, information from the financial account is stored in the user profile store 220. In other embodiments, it may be stored in the financial account store 250, which is further described below.

The content store 240 stores content items associated with a user profile, such as images, videos or audio files. Content items from the content store 240 may be displayed when a user profile is viewed or when other content associated with the user profile is viewed. For example, displayed content items may show images or video associated with a user profile or show text describing a user's status. Additionally, other content items may facilitate user engagement by encouraging a user to expand his or her connections to other users, to invite new users to the system or to increase interaction with the social networking system by displaying content related to users, objects, activities or functionalities of the networking system 101. Examples of social networking content items include suggested connections or suggestions to perform other actions, media provided to, or maintained by, the networking system 101 (e.g., pictures or videos), status messages or links posted by users to the networking system 101, events, groups, pages (e.g., representing an organization or commercial entity), and any other content provided by, or accessible via, the networking system 101.

The content store 240 also includes one or more pages associated with entities having user profiles in the user profile store 220. An entity is a non-individual user of the networking system 101, such as a business, a vendor, an organization or a university. A page includes content associated with an entity and instructions for presenting the content to a networking system 101 user. For example, a page identifies content associated with the entity's user profile as well as information describing how to present the content to users viewing the brand page. Vendors may be associated with pages in the content store 240, allowing networking system 101 users to more easily interact with the vendor via the networking system 101. A vendor identifier is associated with a vendor's page, allowing the networking system 101 to identify the vendor and/or to retrieve additional information about the vendor from the user profile store 220, the action log 230 or from any other suitable source using the vendor identifier. In some embodiments, the content store 240 may also store one or more targeting criteria associated with stored objects and identifying one or more characteristics of a user to which the object is eligible to be presented.

The action logger 225 receives communications about user actions on and/or off the networking system 101, populating the action log 230 with information about user actions. Such actions may include, for example, adding a connection to another user, sending a message to another user, uploading an image, reading a message from another user, viewing content associated with another user and attending an event posted by another user, among others. In some embodiments, the action logger 225 receives, subject to one or more privacy settings, transaction information from a financial account associated with a user and identifies user actions from the transaction information. For example, the action logger 225 retrieves vendor identifiers from the financial account's transaction history and identifies an object, such as a page, in the networking system 101 associated with the vendor identifier. This allows the action logger 225 to identify a user's purchases of products or services that are associated with a page, or another object, in the content store 240. In addition, a number of actions described in connection with other objects are directed at particular users, so these actions are associated with those users as well. These actions are stored in the action log 230.

The action log 230 may be used by the networking system 101 220 to track user actions on the networking system 101, as well as external website that communicate information to the networking system 101. Users may interact with various objects on the networking system 101, including commenting on posts, sharing links, checking-in to physical locations via a mobile device, accessing content items in a sequence or other interactions. Information describing these actions is stored in the action log 230. Additional examples of interactions with objects on the networking system 101 included in the action log 230 include commenting on a photo album, communications between users, becoming a fan of a musician, adding an event to a calendar, joining a group, becoming a fan of a brand page, creating an event, authorizing an application, using an application and engaging in a transaction. Additionally, the action log 230 records a user's interactions with advertisements on the networking system 101 as well as other applications operating on the networking system 101. In some embodiments, data from the action log 230 is used to infer interests or preferences of the user, augmenting the interests included in the user profile and allowing a more complete understanding of user preferences.

The action log 230 may also store user actions taken on external websites and/or determined from a financial account associated with the user. For example, an e-commerce website that primarily sells sporting equipment at bargain prices may recognize a user of a networking system 101 through social plug-ins that enable the e-commerce website to identify the user of the networking system 101. Because users of the networking system 101 are uniquely identifiable, e-commerce websites, such as this sporting equipment retailer, may use the information about these users as they visit their websites. The action log 230 records data about these users, including webpage viewing histories, advertisements that were engaged, purchases made and other patterns from shopping and buying. Actions identified by the action logger 225 from the transaction history of a financial account associated with the user allow the action log 230 to record further information about additional types of user actions. In some embodiments, content of the action log 230 may be stored in the database 135.

In one embodiment, an edge store 245 stores the information describing connections between users and other objects on the networking system 101 in edge objects. Some edges may be defined by users, allowing users to specify their relationships with other users. For example, users may generate edges with other users that parallel the users' real-life relationships, such as friends, co-workers, partners and so forth. Other edges are generated when users interact with objects in the networking system 101, such as expressing interest in a page on the networking system 101, sharing a link with other users of the networking system 101, and commenting on posts made by other users of the networking system 101. The edge store 245 stores edge objects that include information about the edge, such as affinity scores for objects, interests and other users. Affinity scores may be computed by the networking system 101 over time to approximate a user's affinity for an object, interest and other users in the networking system 101 based on the actions performed by the user. Multiple interactions between a user and a specific object may be stored in one edge object in the edge store 245, in one embodiment. In some embodiments, connections between users may be stored in the user profile store 220, or the user profile store 220 may access the edge store 245 to determine connections between users.

Ptail 280 is an internal tool in the networking system 101 to aggregate user data streams from a scribed system. The user data streams may be collected from web servers, backend servers, user scripts and Chrome applications, etc. Periodically, Ptail 280 provides and caches Ptail checkpoints in memory of application nodes (e.g., Puma nodes 290).

Puma node 290 is a near-real-time analytic engine, which is designed for analytics and insight report (i.e., demographical breakdowns, website analysis, Clicks, Likes, Shares, Comments and Impressions) and can be used for processing and computing time-series data. In some embodiments, Puma node 290 may batch data for a predetermined period of time (e.g., 1.5 seconds, 20 seconds or 5 minutes) before forwarding them for either further processing or store them in HBase. In some embodiments, Puma node 290 may start a new batch when last flush is completed to avoid lock contention issues.

Intelligent API server 295 provides an intelligent API to communicate with a specific fetcher instantiated on a particular user device. The specific fetcher is configured to cache static resource from the networking system 101. The intelligent API server 295 may analyze the particular user's activities on the networking system 101 and provide the analysis updates to the specific fetcher.

In one embodiment, the database 135 may be defined as a computer system for serving data to users. The database 135 may be a computer system as described in FIG. 6. In some embodiments, the database 135 may include, for example, an HBase, an MySQL, a Hadoop machine, a file server machine or a computer connected to multiple storage devices.

The database 135 may contain any type of computer writable and readable storage media. By way of example, the storage media may include a volatile memory (i.e., a random access memory (RAM), etc.), a non-volatile memory (i.e., a flash memory, a read-only memory (ROM), etc.), a hard disk, an optical disc, a floppy disk, a magnetic tape, a solid-state drive (SSD), a secure digital (SD) card, or any suitable computer-readable storage medium or a combination of two or more of these.

Figure 3:
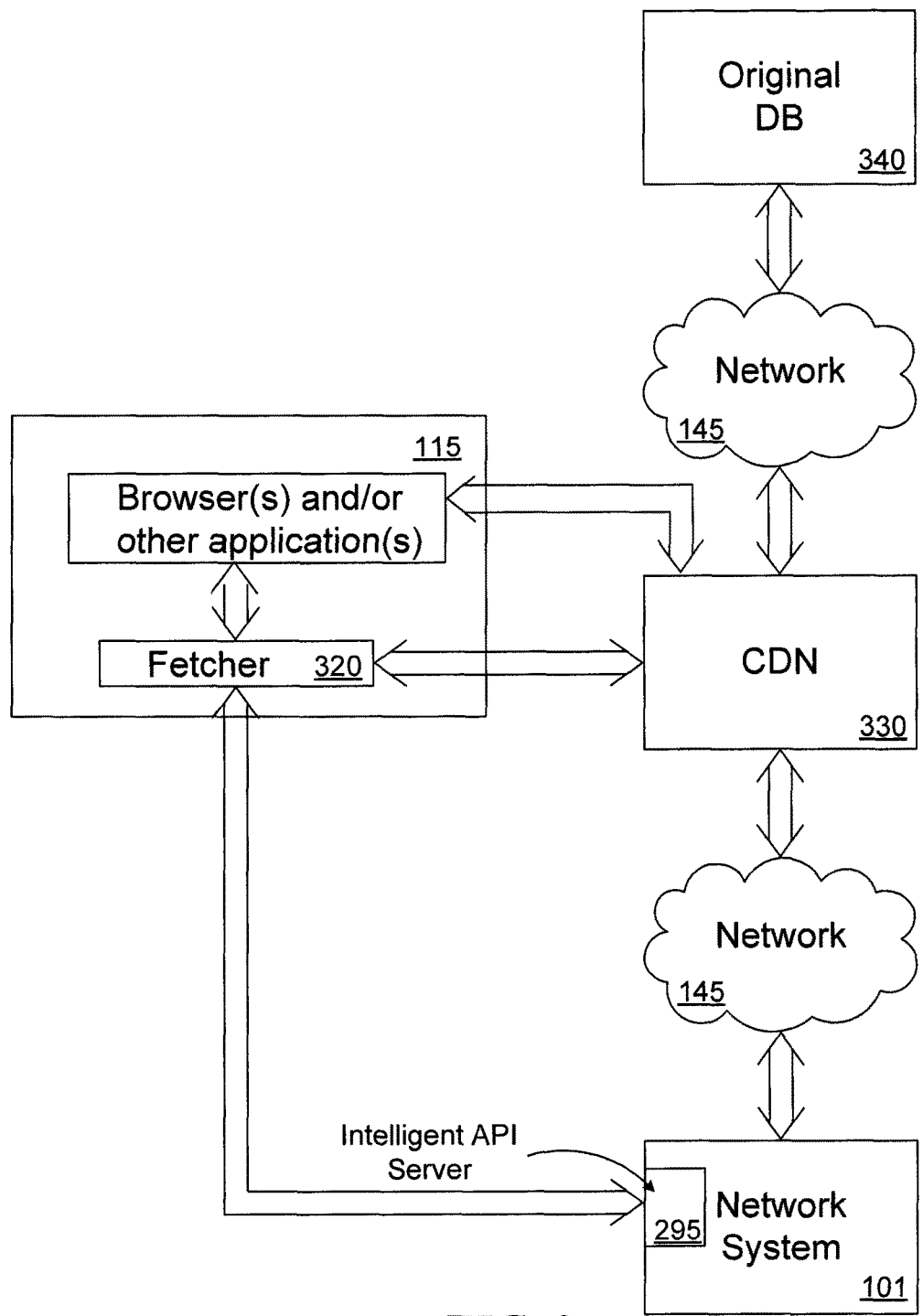
FIG. 3 illustrates a block diagram of caching static resource data from the networking system 101 on a user device, in accordance with various embodiments of the present disclosure.

FIG. 3 illustrates a block diagram of caching static resource data from the networking system 101 on a user device, in accordance with various embodiments of the present disclosure. The static resource data may include contents such as style sheets, videos, images, audios, animations, other passive media, or any combination of thereof. The content of the static resource data may be presented in the format of programming languages, such as JavaScript code, HTML, XML, and/or Cascading Style Sheets (CSS) code etc.

The networking system 101 includes an intelligent API server 295 for providing improved web experience to users. The intelligent API server 295 is configured to communicate with a specific fetcher 320 instantiated on a particular user device 115. The specific fetcher 320 can be a browser plug-in, a separate process (e.g., a daemon), and/or a program integrated into another process on the particular user device 115, such as a virtual desktop etc. In some implementations, the specific fetcher 320 can be integrated into an application on the particular user device 115 that deals with point-to-point communications and/or multicast communications between the particular user device 115 and the networking system 101, such as an instant messenger etc.

The specific fetcher 320 caches static resource data from the networking system 101 on the particular user device 115.

When any browser on the particular user device 115 opens a web page from the networking system 101, static resource data can be readily available in memory of the specific fetcher 320 to minimize network I/O delay. In some embodiments, the static resource data of a specific web page are cached on the specific fetcher 320 even before any browser is launched on the particular user device 115.

In some embodiments, the static resource data stored in memory of the specific fetcher 320 are grouped into a plurality of static resource packages with different levels of granularity. The level of granularity may be determined by a variety of factors, such as properties of individual static resource data, specific requirements of the particular user device 115, and/or specific requirements of applications on the particular user device 115 etc. In some implementations, each static resource package has substantially similar data size.

Each static resource package may be tagged with a version number of the package and/or the time being updated. In one embodiment, the version number can be used to distinguish a newer version from an older version. In another embodiment, each static resource package can have multiple versions to accommodate different types of user devices (e.g., laptops and iPhones), displays with different resolutions, different types of browsers (e.g., Microsoft Internet Explorer and Mozilla Firefox), different languages (e.g., English, Hindi and Mandarin), or any combination thereof.

In some embodiments, each static resource package may be a unique HTML/XML file or graphic image. In another embodiment, multiple HTML/XML files and/or multiple graphic images may be grouped into a single static resource package according to a predefined method. For example, HTML/XML files and/or multiple graphic images with the same resource link (e.g., the same URL link) may be grouped into a single static resource package. For another example, HTML/XML files and multiple graphic images may be categorized into multiple tiers according to the individual file's and/or image's update frequency. Files and graphic images with the lowest update frequencies can be grouped into a single static resource package. Individual HTML/XML files or graphic images that have the highest update frequencies can be grouped into separate static resource packages.

In one embodiment, each static resource package is cached and updated as a whole in memory of the specific fetcher 320. In another embodiment, the specific fetcher 320 may request delta changes to a cached specific static resource package and update only the requested delta changes of the cached specific static resource package.

The intelligent API server 295 may analyze credentials and/or activities of the particular user on the networking system 101. In some embodiments, the intelligent API server 295 further analyzes the web traffics of the particular user based on the information provided by the specific fetcher 320. Based on the analysis results, the intelligent API server 295 may determine static resource packages that have been used frequently by the particular user and cache them on the specific fetcher 320.

In some embodiments, the specific fetcher 320 may cache all static and dynamic resource packages from the networking system 101 and update cached resource packages in substantially real-time by requesting updated resource packages directly from the intelligent API server 295.

In some embodiments, the intelligent API server 295 may predict new static resource packages that the particular user may need by analyzing the information available on the networking system 101 and/or the particular user device 115 according to a computing algorithm. The intelligent API server 295 then caches the predicted new static resource packages on the specific fetcher 320. The computing algorithm can be dynamically constructed or fine-tuned based on past predictions and the particular user's actual needs.

The intelligent API server 295 may transmit the analysis results to the specific fetcher 320. The analysis results from the intelligent API server 295 may include necessary information to access the predicted new static resource packages, such as most current or suitable version number(s) and location(s) or resource links (e.g., URL links) etc. In one embodiment, the specific fetcher 320 may request the new static resource packages directly from the networking system 101 through the intelligent API server 295. In another embodiment, the specific fetcher 320 may request the predicted new static resource packages from a content distribution network (CDN) 330.

The CDN 330 is a large distributed system of servers deployed in the network 145 and serves clients with Internet content, such as web objects (e.g., texts, graphics, URLs and scripts), downloadable objects (e.g., media files, software and documents), applications (e.g., e-commerce and portals), live streaming media, on-demand streaming media and contents on social networks etc. If the CDN 330 hasn't cached the new static resource packages, the CDN 330 may fetch the packages directly from the original databases 340 and/or the networking system 101 through the network 145.

In some embodiments, the CDN 330 may be incorporated in the networking system 101. The CDN 330 stores popular contents that have high demands from the networking system 101 and other servers (e.g., social networks and web server systems). Upon receiving a request from the specific fetcher 320 to download a specific static resource package, the incorporated CDN 330 may determine an optimized route for the specific fetcher 320 to download the specific static resource package. The CDN 330 may provide the specific static resource package directly from its data storage or redirect the request to original databases 340 and/or a database server that can provide the specific static resource package with the lowest latency. In some embodiments, by redirecting requests from the specific fetcher 320, the incorporated CDN 330 can reduce server load and bandwidth requirement of the networking system 101 and improve the response time for caching static resource content.

The intelligent API server 295 may generate and store a status map of the plurality of static resource data packages from the networking system 101. The status map includes identifications of static resource data packages (i.e., package IDs), resource links associated with each static resource data package, and/or the version information of each static resource data package. The status map can be a hash table, a tree, a binary tree, a dictionary, a list, an array, a vector, a database, or any combination thereof. With an input of identification of a specific resource data package, the status map outputs version information of the specific resource data package and locations or resource links of the specific resource data package. In some embodiments, the status map may be cached on the specific fetcher 320, span multiple locations and databases of the networking system 101, and/or store in a cloud. In some embodiments, the status map is generated and maintained by the specific fetcher 320.

The status map may be updated in substantially real time when there is any change related to the static resource data packages cached on the specific fetcher 320, such as changes to resource link and version number of cached static resource packages, an old static resource data package being removed from the specific fetcher 320, and/or a newly predicted status resource data package being added to the specific fetcher 320 etc. If a new version of a specific static resource package becomes available, the specific fetcher 320 may re-download the specific static resource package from the CDN 330. If the specific static resource package is not available on the CDN 330, the CDN 330 may act as proxy to fetch the specific static resource package from the original database 340. In some embodiments, the specific static resource package may be fetched directly from the networking system 101 through the intelligent API server 295.

In some embodiments, when a new static resource package is predicted, the status map is updated in substantially real time. According to the updated status map, the specific fetcher 320 may first determine whether the newly predicted static resource package has been cached in its memory. If the newly predicted static resource package is not cached, the specific fetcher 320 may fetch the package from the CDN 330 or directly from the networking system 101 through the intelligent API server 295.

The specific fetcher 320 may communicate with the intelligent API server 295 based on a predefined policy to ensure that the plurality of static resource packages with the suitable version numbers are cached on the specific fetcher 320. Whenever a new static resource package is cached on the specific fetcher 320, the specific fetcher 320 may request from the intelligent API server 295 a list of static resource packages that the particular user may need and their corresponding suitable version numbers. If the newly cached static resource package is not in the list of static resource packages that the particular user may need, the fetcher may evict the newly cached static resource package and download correct static resource packages according to the list. If the version number of the newly cached static resource package is not correct, the fetcher may re-download the correct version of the newly cached static resource package.

In some embodiments, the predefined policy requires the specific fetcher 320 to periodically re-download cached static resource packages. If a specific static resource package has not been updated for a certain period of time (e.g., a day), the specific fetcher 320 requests the suitable version number of the specific static resource package and re-download the specific static resource package either directly from the networking system 101 or from the CDN 330.

In some embodiments, the predefined policy requires the specific fetcher 320 to periodically evict static resource packages that have not been used by the particular user for a predetermined period of time (e.g., 2 days). In some embodiments, the predefined policy sets a storage cap (e.g., 5 GB) for static resource packages from a specific web server. When the size of static resource packages goes above the storage cap, only the most recently used static resource packages are cached on the fetcher. Oldest static resource packages may be automatically evicted from the fetcher when newest static resource packages are downloaded.

Figure 4:
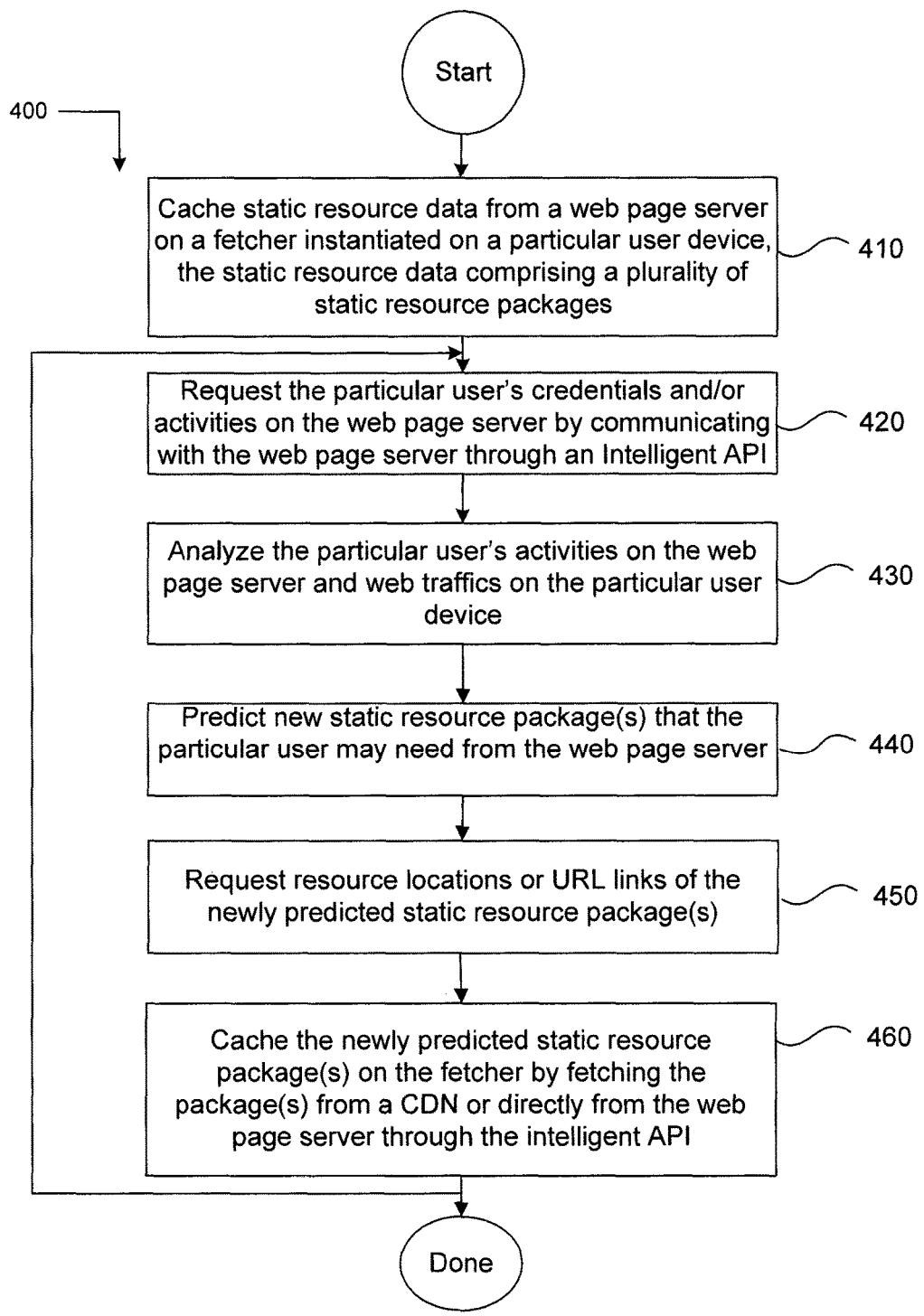
FIG. 4 illustrates a flow chart showing a set of operations 400 that may be used for caching static resource data from the networking system 101 on a user device with which some embodiments of the present disclosure may be utilized.

FIG. 4 illustrates a flow chart showing a set of operations 400 that may be used for caching static resource data from the networking system 101 on a user device with which some embodiments of the present disclosure may be utilized. The operations illustrated in FIG. 4 may be performed in various embodiments by fetcher 320, CDN 330, and intelligent API server 295 associated with the networking system 101.

At step 410, static resource data from a web server may be fetched and cached on a fetcher instantiated on a particular user device. The static resource data may comprise a plurality of static resource packages. Each static resource package is tagged with a version number and/or the time being updated. The data size of each static resource package may be determined by attributes of individual static resource file or image and specific requirements of the particular user device and applications on the particular user device. In some embodiments, the size of each static resource package may be substantially the same.

At step 420, the fetcher may request the particular user's credentials and activities on the web server by communicating with the web server through an intelligent API. At step 430, the fetcher analyzes the particular user's credentials and activities on the web server. In some embodiments, the fetcher may further analyze web traffics on the particular user device.

At step 440, the fetcher may predict new static resource package(s) that the particular user may need from the web server based on the analysis results. In some embodiments, the analysis is conducted according to a computer algorithm, which can be dynamically constructed and fine-tuned over time. At step 450, the fetcher requests resource locations or URL links of the newly predicted static resource package(s) from the web server. The newly predicted static resource package(s) may be fetched from a CDN or directly from the web server through the intelligent API. At step 460, the fetched static resource package(s) are cached on the fetcher.

While the method 400 of FIG. 4 is described in the context of a single web server, the present disclosure contemplates a plurality of web servers. The plurality of web servers can be located at a single location or a variety of locations.

Figure 5:
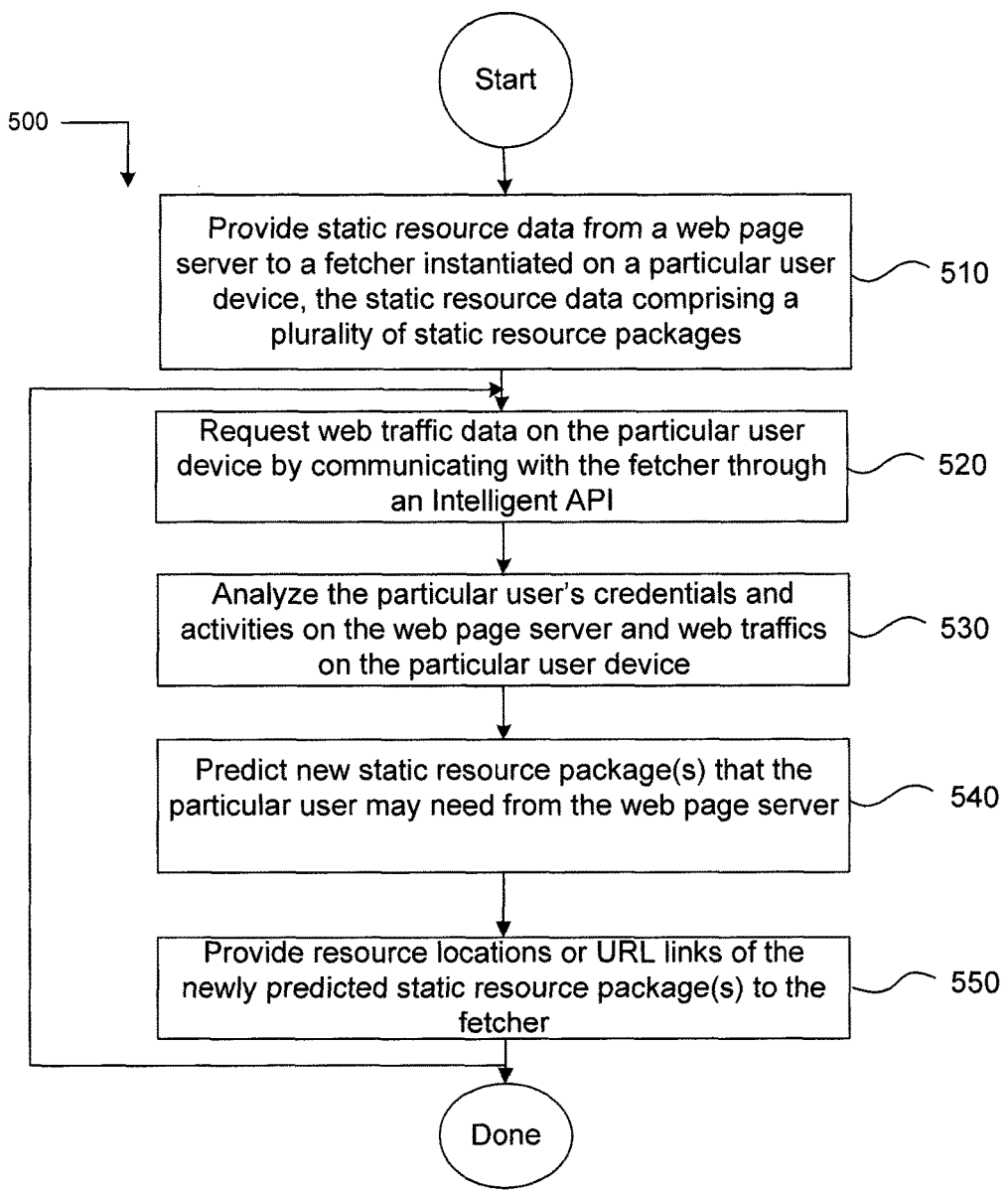
FIG. 5 illustrates a flow chart showing a set of operations 500 that may be used for caching static resource data from the networking system 101 on a user device, in accordance with various embodiments of the present disclosure.

FIG. 5 illustrates a flow chart showing a set of operations 500 that may be used for caching static resource data from the networking system 101 on a user device, in accordance with various embodiments of the present disclosure. At step 510, static resource data from a web server are provided to a fetcher instantiated on a particular user device. The static resource data may be grouped into a plurality of static resource packages. At step 520, web traffic data on the particular user device can be requested by communicating with the fetcher through an intelligent API. At step 530, an intelligent API server may analyze the web traffic data on the particular user device and the particular user's credentials and activities on the web server.

At step 540, the intelligent API server predicts new static resource package(s) that the particular user may need from the web server. If the fetcher hasn't cached the newly predicted static resource packages, resource locations and/or URL links of the newly predicted static resource package(s) can be provided to the fetcher at step 550. In some embodiments, the newly predicted static resource package(s) may be provided to the fetcher through the intelligent API.

In some embodiments, the intelligent API server generates and stores a status map of the plurality of static resource data packages. The status map includes each static resource package's identifications, resource links, and/or version information.

Figure 6:
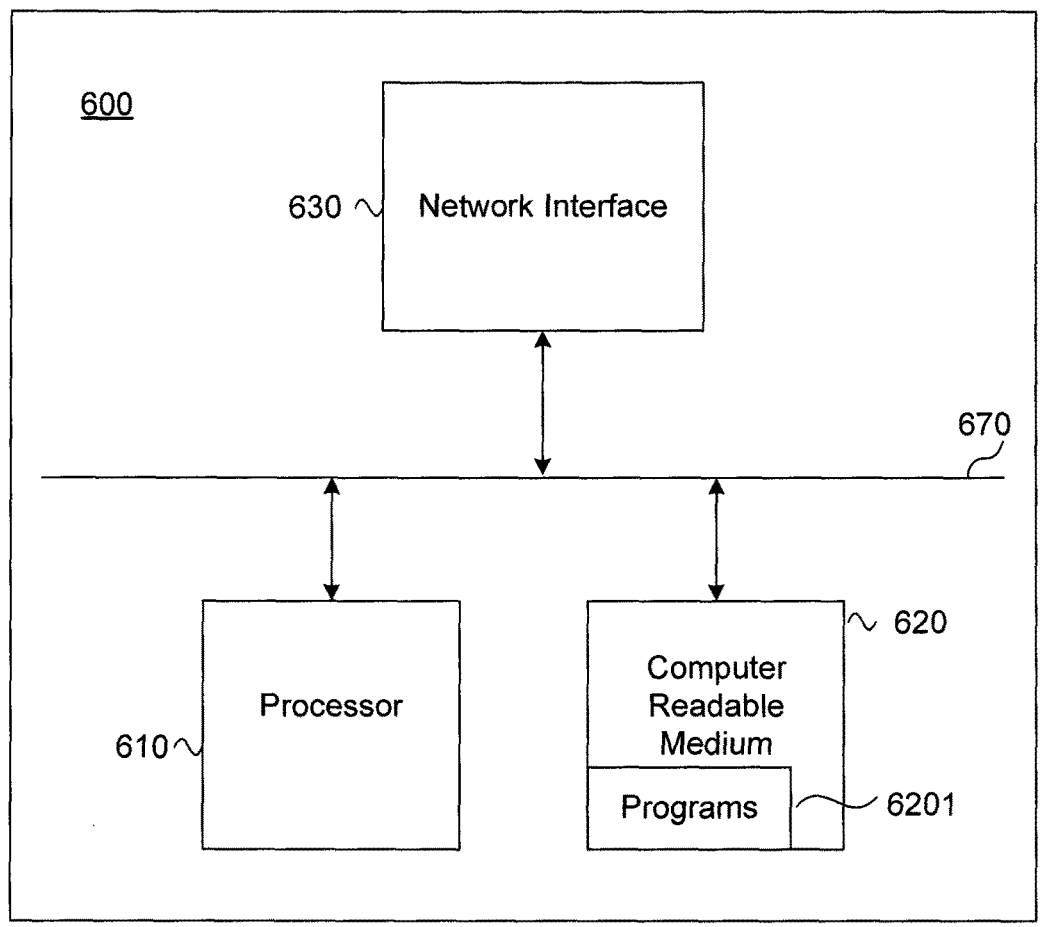
FIG. 6 illustrates an example of a computer system with which some embodiments of the present disclosure may be utilized.

FIG. 6 illustrates a diagram of a computer system 600, in accordance with yet another embodiment of the present disclosure. The computer system 600 may include at least one processor 610, one or more network interface 630 and one or more computer readable medium 620, all interconnected via one or more bus 670. In FIG. 6, various components are omitted for illustrative simplicity. The computer system 600 is intended to illustrate a device on which any other components described in this specification (i.e., any of the components depicted in FIGS. 1-5) can be implemented.

The computer system 600 may take a variety of physical forms. By way of examples, the computer system 600 may be a desktop computer, a laptop computer, a personal digital assistant (PDA), a portable computer, a tablet PC, a wearable computer, an interactive kiosk, a mobile phone, a server, a mainframe computer, a mesh-connected computer, a single-board computer (SBC) (i.e., a BeagleBoard, a PC-on-a-stick, a Cubieboard, a CuBox, a Gooseberry, a Hawkboard, a Mbed, a OmapZoom, a Origenboard, a Pandaboard, a Pandora, a Rascal, a Raspberry Pi, a SheevaPlug, a Trim-Slice, etc.), an embedded computer system, or a combination of two or more of these. Where appropriate, the computer system 600 may include one or more computer systems 600, be unitary or distributed, span multiple locations, span multiple machines, or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

The computer system 600 preferably may include an operating system such as, but not limited to, Windows®, Linux® or Unix®. The operating system may include a file management system, which organizes and keeps track of files. In some embodiments, a separate file management system may be provided. The separate file management can interact smoothly with the operating system and provide enhanced and/or more features, such as improved backup procedures and/or stricter file protection.

The at least one processor 610 may be any suitable processor. The type of the at least one processor 610 may comprise one or more from a group comprising a central processing unit (CPU), a microprocessor, a graphics processing unit (GPU), a physics processing unit (PPU), a digital signal processor, a network processor, a front end processor, a data processor, a word processor and an audio processor.

The one or more bus 670 is configured to couple components of the computer system 600 to each other. As an example and not by way of limitation, the one or more bus 670 may include a graphics bus (i.e., an Accelerated Graphics Port (AGP)), an Enhanced Industry Standard Architecture (EISA) bus, a front-side bus (FSB), a HyperTransport (HT) interconnect, an Industry Standard Architecture (ISA) bus, an Infiniband interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Although the present disclosure describes and illustrates a particular bus, this disclosure contemplates any suitable bus or interconnects.

The one or more network interface 630 may include one or more of a modem or network interface. It will be appreciated that a modem or network interface can be considered to be part of the computer system 600. The interface can include an analog modem, an asymmetric digital subscribe line (ADSL) modem, a cable modem, a doubleway satellite modem, a power line modem, a token ring interface, a Cambridge ring interface, a satellite transmission interface or any suitable interface for coupling a computer system to other computer systems. The interface can include one or more input and/or output devices. The I/O devices can include, by way of example but not limitation, a keyboard, a mouse or other pointing device, disk drives, printers, a scanner, a touch screen, a Tablet screen, and other input and/or output devices, including a display device. The display device can include, by way of example but not limitation, a cathode ray tube (CRT) display, a liquid crystal display (LCD), a 3-D display, or some other applicable known or convenient display device. For simplicity, it is assumed that controllers of any devices not depicted in the example of FIG. 6 reside in the interface.

The computer readable medium 620 may include any medium device that is accessible by the processor 610. As an example and not by way of limitation, the computer readable medium 620 may include volatile memory (i.e., a random access memory (RAM), a dynamic RAM (DRAM), and/or a static RAM (SRAM)) and non-volatile memory (i.e., a flash memory, a read-only memory (ROM), a programmable ROM (PROM), an erasable programmable ROM (EPROM), and/or an electrically erasable programmable ROM (EEPROM)). When appropriate, the volatile memory and/or non-volatile memory may be single-ported or multiple-ported memory. This disclosure contemplates any suitable memory. In some embodiments, the computer readable medium 620 may include a semiconductor-based or other integrated circuit (IC) (i.e., a field-programmable gate array (FPGA) or an application-specific IC (ASIC)), a hard disk, an HDD, a hybrid hard drive (HHD), an optical disc (i.e., a CD-ROM, or a digital versatile disk (DVD)), an optical disc drive (ODD), a magneto-optical disc, a magneto-optical drive, a floppy disk, a floppy disk drive (FDD), a magnetic tape, a holographic storage medium, a solid-state drive (SSD), a secure digital (SD) card, a SD drive, or another suitable computer-readable storage medium or a combination of two or more of these, where appropriate. The computer readable medium 620 may be volatile, non-volatile, or a combination of volatile and non-volatile, where appropriate.

Programs 6201 may be stored on the one or more computer readable media 620. As an example, but not by way of limitation, the computer system 600 may load the programs 6201 to an appropriate location on the one or more compute readable media 620 for execution. The programs 6201, when executed, may cause the computer system 600 to perform one or more operations or one or more methods described or illustrated herein. In some implementations, the operations may include, but are not limited to, caching static resource data from a web server on a fetcher instantiated on a particular user device, the static resource data comprising a plurality of static resource packages; requesting the particular user's credentials and/or activities on the web server via an intelligent API of the web server; analyzing the particular user's credentials and/or activities on the web server and web traffics on the particular user device; predicting new static resource package(s) that the particular user may need from the web server according to a computing algorithm; requesting resource locations or links of the newly predicted static resource package(s); fetching the newly predicted resource package(s) from the web server via the intelligent API or a CDN; and caching the newly predicted static resource package(s) on the fetcher.

As will be appreciated by one of ordinary skill in the art, the operations or methods may be instantiated locally (i.e., on one local computer system) and may be distributed across remote computer systems. For example, it may be determined that the available computing power of the local computer system is insufficient or that additional computing power is needed, and may offload certain aspects of the operations to the cloud.

While the computer-readable medium is shown in an embodiment to be a single medium, the term "computer-readable medium" should be taken to include single medium or multiple media (e.g., a centralized or distributed database, and/or associated caches and servers) that stores the one or more sets of instructions. The term "computer-readable medium" shall also be taken to include any medium that is capable of storing, encoding or carrying a set of instructions for execution by the computer and that cause the computer to perform any one or more of the methodologies of the presently disclosed technique and innovation.

Further examples of computer-readable medium, machine-readable storage medium, machine-readable medium or computer-readable (storage) medium include but are not limited to recordable type medium such as volatile and non-volatile memory devices, floppy and other removable disks, hard disk drives, optical disks, Digital Versatile Disks, among others and transmission type medium such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The computer may be, but is not limited to, a server computer, a client computer, a personal computer (PC), a tablet PC, a laptop computer, a set-top box (STB), a personal digital assistant (PDA), a cellular telephone, an iPhone®, an iPad®, a processor, a telephone, a web appliance, a network router, switch or bridge, or any machine capable of executing a set of instructions (sequential or otherwise) that specify actions to be taken by that machine.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In general, the routines executed to implement the embodiments of the disclosure may be implemented as part of an operating system or a specific application, component, program, object, module or sequence of instructions referred to as "programs." The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but is not limited to." As used herein, the terms "connected," "coupled," or any variant thereof, means any connection or coupling, either direct or indirect, between two or more elements; the coupling of connection between the elements can be physical, logical or a combination thereof. Additionally, the words "herein," "above," "below" and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word, any of the items in the list, all of the items in the list and any combination of the items in the list.

The above detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further, any specific numbers noted herein are only examples—alternative implementations may employ differing values or ranges.

The teaching of the disclosure provided herein can be applied to other systems and not necessarily to the system described above. Any patents and applications and other references noted above, including any that may be listed in accompanying filing papers, are incorporated herein by reference. Aspects of the disclosure can be modified if necessary to employ the systems, functions and concepts of the various references described above to provide yet further embodiments of the disclosure.

Any patents and applications and other references noted above, including any that may be listed in accompanying filing papers, are incorporated herein by reference. Aspects of the disclosure can be modified if necessary to employ the systems, functions, and concepts of the various references described above to provide yet further embodiments of the disclosure.

These and other changes can be made to the disclosure in light of the above Detailed Description. While the above description describes certain embodiments of the disclosure and describes the best mode contemplated, no matter how detailed the above appears in text, the teachings can be practiced in many ways. Details of the system may vary considerably in its implementation details while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally or logically, are understood to be implemented by computer programs or equivalent electrical circuits, microcode or the like. Furthermore, it has also proven convenient at times to refer to these arrangements of operations as modules, without loss of generality. The described operations and their associated modules may be embodied in software, firmware, hardware or any combinations thereof.

Any of the steps, operations or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer-readable storage medium, or any type of medium suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer-readable storage medium and may include any embodiment of a computer program product or other data combination described herein.

What is claimed is:

1. A method, comprising:
    caching static resource data from a web server on a fetcher instantiated on a particular user device of a particular user, the static resource data comprising a plurality of static resource packages, wherein the static resource data are grouped into the plurality of static resource packages based on different granularity levels, wherein a specified granularity level of the granularity levels with which a specified static resource package of the plurality of static resource packages is associated corresponds to an update frequency range, and wherein the static resource data having an update frequency in the update frequency range is grouped into the specified static resource package;

requesting credentials and/or activities on the web server corresponding to the particular user via an intelligent API of the web server;

analyzing web traffic data on the particular user device and the credentials and/or activities on the web server;

predicting, based on results of said analyzing of the web traffic data and the credentials and/or activities, new static resource packages that the particular user may need from the web server according to a computing algorithm;

requesting resource links of the predicted new static resource packages;

fetching the predicted new static resource packages from a content distribution network (CDN) or directly from the web server via the intelligent API; and caching the newly predicted static resource packages on the fetcher.

2. The method of claim 1, wherein the fetcher is a browser plug-in, a separate process, and/or a program integrated into another process on the particular user device.

3. The method of claim 1, wherein the static resource data are grouped into the plurality of static resource packages based on different granularity levels, wherein a particular granularity level is determined by attributes of individual static resource file or image, specific requirements of the particular user device, and/or specific requirements of applications on the particular user device.

4. The method of claim 1, wherein each static resource package of the plurality of static resource packages has multiple version numbers to accommodate different user devices, different displays, different browsers, and/or different languages.

5. The method of claim 1, further comprising: generating a status map of the plurality of static resource packages cached on the fetcher, the status map including identifications, resource links, and version numbers of the plurality of static resource packages.

6. The method of claim 5, wherein the status map is a hash table, a tree, a binary tree, a dictionary, a list, an array, a vector, and/or a database; and wherein the status map is cached on the fetcher, the web server and/or a cloud.

7. The method of claim 5, further comprising:
when there is a change to a particular static resource package of the plurality of static resource packages cached on the fetcher or a new static resource package is predicted, updating the status map in substantially real time;

comparing the updated status map with the plurality of static resource packages cached on the fetcher; and if a specific static resource package is not cached or a wrong version of the specific static resource package is cached:
fetching the specific static resource package with a correct version number from the CDN or directly from the web server via the intelligent API; and
caching the fetched specific static resource package on the fetcher.

8. The method of claim 7, wherein the CDN is incorporated in the web server, the CDN configured to determine a route with a lowest latency for the fetcher to download the specific static resource package with the correct version number.

9. The method of claim 1, further comprising:
determining delta changes to a particular static resource package of the plurality of static resource packages cached on the fetcher;
downloading the delta changes from the CDN or directly from the web server via the intelligent API; and
updating the particular static resource package with the downloaded delta changes.

10. The method of claim 1, further comprising:
periodically re-downloading the plurality of static resource packages cached on the fetcher after a first predetermined period of time; and
periodically evicting cached static resource packages that have not been used by the particular user after a second predetermined period of time.

11. A web server, comprising:
a processor;
a computer system; and
an application program instantiated on the computer system, wherein the application program provides computer-generated output;
wherein the computer system is configured to:
cache static resource data from a web server on a fetcher instantiated on a particular user device of a particular user, the static resource data comprising a plurality of static resource packages, wherein the static resource data are grouped into the plurality of static resource packages based on different granularity levels, wherein a specified granularity level of the granularity levels with which a specified static resource package of the plurality of static resource packages is associated corresponds to an update frequency range, and wherein the static resource data having an update frequency in the update frequency range is grouped into the specified static resource package;
request credentials and/or activities on the web server corresponding to the particular user via an intelligent API of the web server;
analyze web traffic data on the particular user device and the credentials and/or activities on the web server;
predict, based on results of said analyzing of the web traffic data and the credentials and/or activities, new static resource packages that the particular user may need from the web server according to a computing algorithm;
request resource links of the predicted new static resource packages;
fetch the predicted new static resource packages from a content distribution network (CDN) or directly from the web server via the intelligent API; and
cache the newly predicted static resource packages on the fetcher.

12. The web server as recited in claim 11, wherein the fetcher is a browser plug-in, a separate process, and/or a program integrated into another process on the particular user device.

13. The web server as recited in claim 11, wherein the static resource data are grouped into the plurality of static resource packages based on different granularity levels, wherein a particular granularity level is determined by attributes of individual static resource file or image, specific requirements of the particular user device, and/or specific requirements of applications on the particular user device.

14. The web server as recited in claim 11, wherein each static resource package of the plurality of static resource packages has multiple version numbers to accommodate different user devices, different displays, different browsers, and/or different languages.

15. The web server as recited in claim 11, wherein the computer system is further configured to:
generate a status map of the plurality of static resource packages cached on the fetcher, the status map including identifications, resource links, and version of the static resource packages.

16. The web server as recited in claim 15, wherein the status map is a hash table, a tree, a binary tree, a dictionary, a list, an array, a vector, and/or a database; and wherein the status map is cached on the fetcher, the web server and/or a cloud.

17. The web server as recited in claim 15, wherein the computer system is configured to:
when there is a change to a particular static resource package of the plurality of static resource packages cached on the fetcher or a new static resource package is predicted, update the status map in substantially real time;
compare the updated status map with the plurality of static resource packages cached on the fetcher; and
if a specific static resource package is not cached or wrong version of the specific static resource package is cached:
fetch the specific static resource package with a correct version number from the CDN or directly from the web server via the intelligent API; and
cache the fetched specific static resource package on the fetcher.

18. The web server as recited in claim 11, wherein the computer system is further configured to:
determine delta changes to a particular static resource package of the plurality of static resource packages cached on the fetcher;
download the delta changes from the CDN or directly from the web server via the intelligent API; and
update the particular static resource package with the downloaded delta changes.

19. The web server as recited in claim 11, wherein the computer system is further configured to:
periodically re-download the plurality of static resource packages cached on the fetcher after a first predetermined period of time; and
periodically evict cached static resource packages that have not been used by the particular user after a second predetermined period of time.

20. A method, comprising:
providing static resource data from a web server to cache on a fetcher instantiated on a particular user device of a particular user, the static resource data comprising a plurality of static resource packages, wherein the static resource data are grouped into the plurality of static resource packages based on different granularity levels, wherein a specified granularity level of the granularity levels with which a specified static resource package of the plurality of static resource packages is associated corresponds to an update frequency range, and wherein the static resource data having an update frequency in the update frequency range is grouped into the specified static resource package;
requesting web traffic data on the particular user device by communicating with the fetcher via an intelligent API;
analyzing credentials and activities on the web server corresponding to the particular user and the web traffic data on the particular user device;
predicting, based on results of said analyzing of the web traffic data and the credentials and activities, new static resource packages that the particular user may need from the web server according to a computing algorithm; and
providing resource links of the predicted new static resource packages to the fetcher.

\* \* \* \* \*